(12) United States Patent
Sano

(10) Patent No.: US 7,801,678 B2
(45) Date of Patent: Sep. 21, 2010

(54) ROUTE SEARCHING ARRANGEMENTS (E.G., METHOD, PROCESS) IN NAVIGATION SYSTEM

(75) Inventor: Katsumi Sano, Zama (JP)

(73) Assignee: Xanavi Informatics Corporation, Kanagawa-Ken (JP)

( * ) Notice: Subject to any disclaimer, the term of this patent is extended or adjusted under 35 U.S.C. 154(b) by 17 days.

(21) Appl. No.: 11/165,213

(22) Filed: Jun. 24, 2005

(65) Prior Publication Data

US 2005/0288855 A1  Dec. 29, 2005

(30) Foreign Application Priority Data

Jun. 25, 2004  (JP) .............................. 2004-188061

(51) Int. Cl.
*G01C 21/34* (2006.01)

(52) U.S. Cl. ............... 701/209; 701/210; 701/211; 701/117; 701/200; 701/201; 340/990; 340/995.1; 340/995.19

(58) Field of Classification Search ......... 701/209–211; 340/995.13, 990, 995
See application file for complete search history.

(56) References Cited

U.S. PATENT DOCUMENTS

| | | | | |
|---|---|---|---|---|
| 5,359,529 A * | 10/1994 | Snider | .................. | 701/210 |
| 5,508,931 A * | 4/1996 | Snider | .................. | 701/207 |
| 5,568,390 A * | 10/1996 | Hirota et al. | ............. | 701/201 |
| 5,752,217 A * | 5/1998 | Ishizaki et al. | .......... | 701/201 |
| 5,862,509 A * | 1/1999 | Desai et al. | ............. | 701/209 |
| 5,892,463 A * | 4/1999 | Hikita et al. | .......... | 340/995.13 |
| 6,072,409 A * | 6/2000 | Fushimi et al. | ........ | 340/995.19 |
| 6,295,503 B1 * | 9/2001 | Inoue et al. | ............ | 701/209 |
| 6,415,225 B1 * | 7/2002 | Hiyokawa et al. | ........ | 701/209 |
| 6,470,266 B1 * | 10/2002 | Ito et al. | ................ | 701/209 |
| 6,609,061 B2 * | 8/2003 | MacPhail et al. | ......... | 701/117 |
| 6,732,049 B2 * | 5/2004 | Sato et al. | ............. | 701/212 |
| 6,804,604 B2 * | 10/2004 | Yamazaki | ................ | 701/211 |
| 6,862,500 B2 * | 3/2005 | Tzamaloukas | ............ | 701/1 |
| 6,873,904 B2 * | 3/2005 | Yamamoto et al. | ........ | 701/200 |
| 7,167,795 B2 * | 1/2007 | Hirose et al. | ............ | 701/210 |
| 7,194,356 B2 * | 3/2007 | Sano | .................... | 701/209 |
| 2001/0021895 A1 * | 9/2001 | Yamazaki | ............... | 701/211 |
| 2005/0071080 A1 * | 3/2005 | Sano | .................... | 701/209 |
| 2005/0131628 A1 * | 6/2005 | Peeters | ................. | 701/200 |
| 2005/0143905 A1 * | 6/2005 | Yoshikawa et al. | ....... | 701/200 |
| 2005/0288855 A1 * | 12/2005 | Sano | .................... | 701/209 |
| 2006/0064239 A1 * | 3/2006 | Ishii | .................... | 701/200 |
| 2006/0253249 A1 * | 11/2006 | Bruelle-Drews | ......... | 701/209 |

FOREIGN PATENT DOCUMENTS

| | | |
|---|---|---|
| JP | 10-141975 | 5/1998 |
| JP | 2000-337899 | 12/2000 |

\* cited by examiner

*Primary Examiner*—Thomas G Black
*Assistant Examiner*—Wae Louie
(74) *Attorney, Agent, or Firm*—Antonelli, Terry, Stout & Kraus, LLP.

(57) ABSTRACT

In a navigation system mounted on a moving object, when the current position exists on a road with time-based regulation on map data, route search is retried ignoring the time-based regulation. It is further possible to conduct the route search ignoring only the time-based regulation on the road where the current position is located.

14 Claims, 8 Drawing Sheets

ROUTE SEARCHING ARRANGEMENTS (E.G., METHOD, PROCESS) IN NAVIGATION SYSTEM

BACKGROUND OF THE INVENTION

The present invention relates to a navigation system, and more particularly, it relates to a route search technique in an in-vehicle type navigation system.

The Japanese Patent Laid-open Publication No. Hei 10-141975 (hereinafter, referred to as "Patent Document 1") discloses an in-vehicle type navigation system which searches for a recommended route, considering a time-based regulation on a road. The in-vehicle type navigation system disclosed in the Patent Document 1 conducts a route search, by using information of the time-based regulation included in map data that is stored in a storage device. When the vehicle deviates from the route having been searched, a technique is also known which retries searching for a route from the deviated point to a destination.

SUMMARY OF THE INVENTION

In the technique disclosed by the Patent Document 1, if the current position is located on a road with time-based regulation according to the map data, retrying the route search may fail. In this situation, it is not possible to conduct a search for a new route, in the case where the time-based regulation is canceled due to a change in transportation condition and thus a user on the vehicle enters the road according to one's own judgment.

The present invention has been made considering the situation above, and the object of the present invention is to provide a technique that searches for a new route with reliability, even when the vehicle deviated from a recommended route.

In order to solve the problem above, when the route search is conducted on a road with time-based regulation according to the map data, the route searching method in the navigation system according to the present invention conducts the route search ignoring the time-based regulation at least of the road on which a moving object currently exists.

Specifically, the navigation system having a current position detecting function is provided with a storage device which stores time-based regulation information relating to time-based regulations of respective links constituting the road on the map. Furthermore, the navigation system performs, a route searching step which utilizes the time-based regulation information and searches for a route, avoiding a link with the time-based regulation (or a link with the time-based regulation in a time zone determined by a departure time), and a route search retrying step which performs a route search without considering the time-based regulation information, when the moving object has deviated from the route searched by the route searching step and is currently positioned on the link with the time-based regulation.

DETAILED DESCRIPTION OF THE PREFERRED EMBODIMENTS

Hereinafter, one embodiment of the present invention will be explained with reference to the accompanying drawings.

Figure 1:
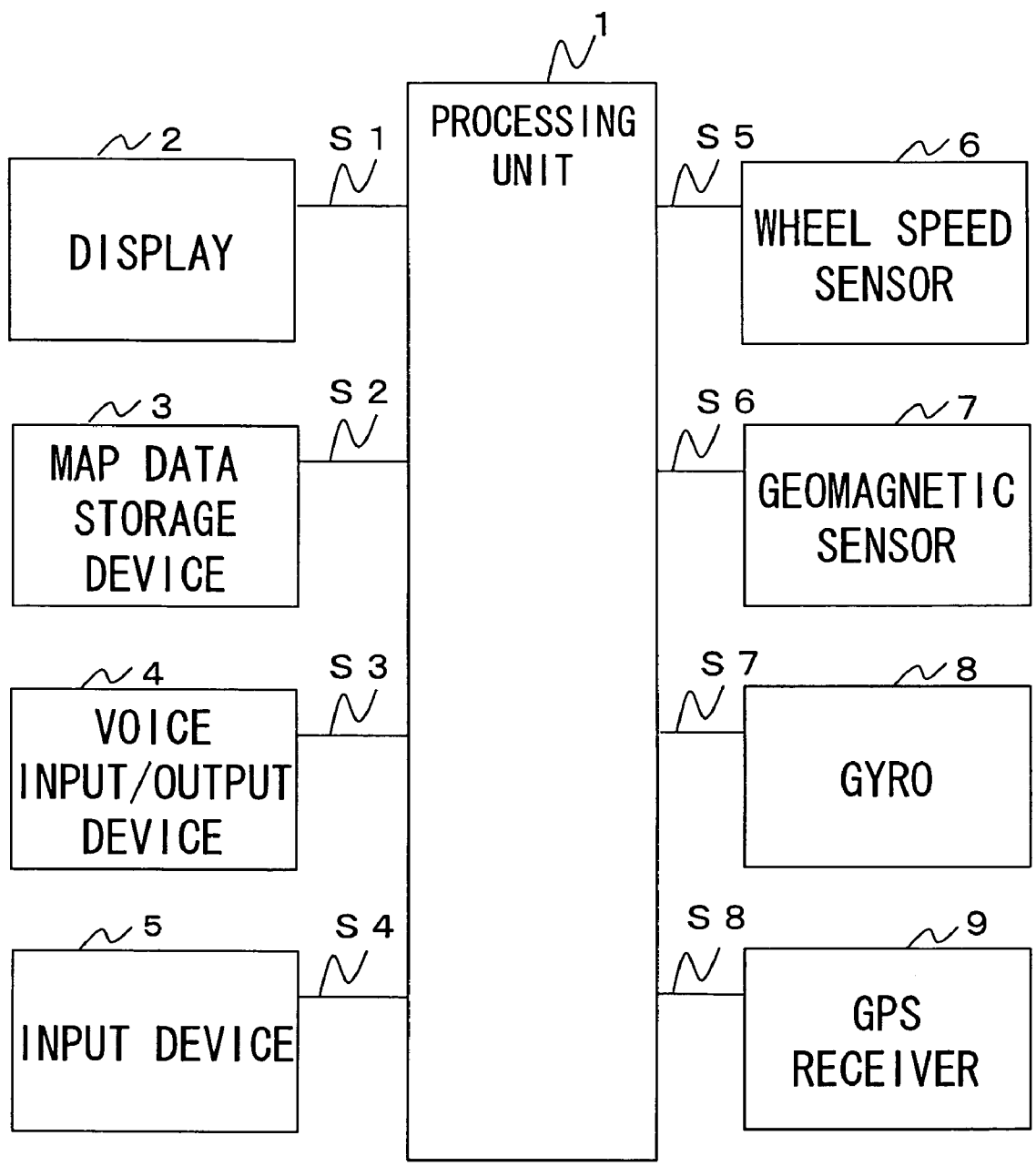
FIG. 1 is a schematic block diagram showing an in-vehicle type navigation system to which one embodiment of the present invention has been applied.

FIG. 1 is a schematic block diagram of the in-vehicle type navigation system to which one embodiment of the present invention has been applied.

As shown in FIG. 1, the in-vehicle type navigation system according to the present embodiment is provided with a processing unit 1, a display 2, a map data storage device 3, a voice input/output device 4, an input device 5, a wheel speed sensor 6, a geomagnetic sensor 7, a gyro sensor 8, and a GPS (Ground Positioning System) receiver 9.

The processing unit 1 is a central unit which conducts various processing. For example, it detects a current position on the basis of the information outputted from the various sensors 6 to 8 and the GPS receiver 9, and reads map data required for displaying from the map data storage device 3 according to the current position information thus obtained. In addition, the processing unit 1 converts thus read out map data 310 to graphics to be displayed on the display 2, with a mark superimposing thereon which indicates the current position. The processing unit 1 further utilizes the map data 310 stored in the map data storage device 3, searches for an optimum route (recommended route) which connects a destination designated by the user with a departure place (for example, the current position), and guides the user by using the voice input/output device 4 and the display 2.

The display 2 is a unit which displays the graphics information generated in the processing unit 1, and includes a CRT, a liquid crystal display, or the like. It is general that a signal S1 to connect the processing unit 1 with the display 2 is a RGB code or NTSC (National Television System Committee) signal.

The map data storage device 3 includes a recording medium, such as CD-ROM, DVD-ROM, HDD, and IC card. This storage medium stores the map data.

Figure 2:
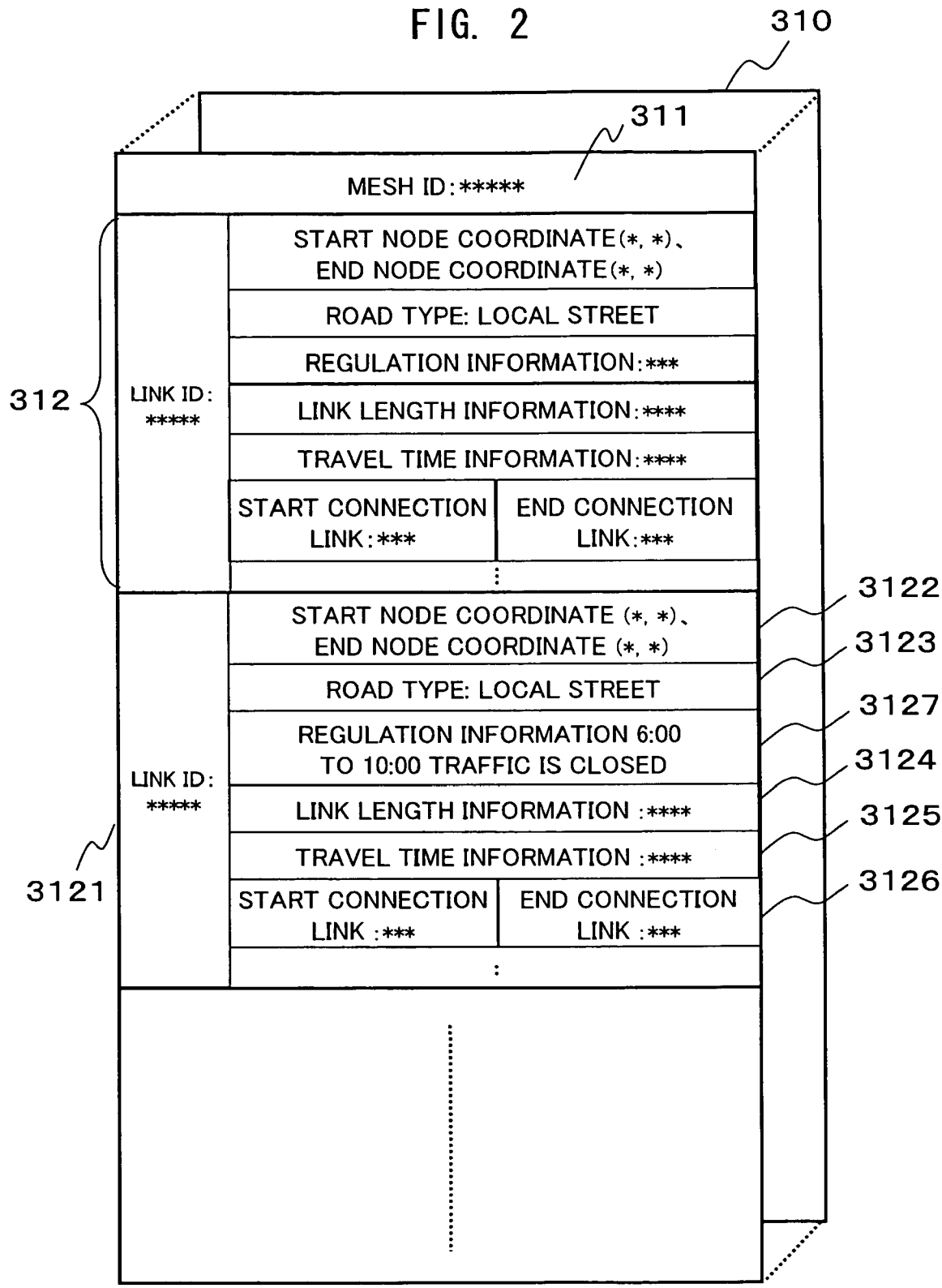
FIG. 2 is an illustration showing an example of map data structure that is stored in map data storage device 3.

FIG. 2 is an illustration showing an example of map data structure that is stored in a map data storage device 3. As illustrated, the map data 310 is stored with respect to each of mesh areas which are obtained by dividing the map into a plurality of areas. The map data 310 includes an identification code of the mesh area (mesh ID) 311 and link data 312 of each of the links constituting the roads contained in the mesh area. The link data 312 includes a link identification code (link ID) 3121, coordinate information 3122 of two nodes (start node and end node) constituting the link, road type information 3123 including the link, link length information 3124 indicating the length of the link, travel time (or moving velocity) information 3125 of the link, regulation information 3127, link IDs (connection link ID) 3126 respectively connected with the two nodes, and the like.

The regulation information 3127 includes a time zone regulating (closing) the traffic in the link. If the time zone of the regulated period varies on a day-to-day basis, such information is also included.

It is to be noted here that a distinction between two nodes constituting a link is made by setting one node as a start node and the other node as an end node, whereby up-direction and down-direction on the same road can be managed as two links different from each other. The map data 310 contains information of map constituent elements other than the roads included in a corresponding mesh area, such as a name, category, coordinate information and the like.

Referring to FIG. 1 again, explaining the present embodiment will be continued. The voice input/output device 4 performs processing to convert a message to the user generated in the processing unit 1 into a voice signal and output the thus converted signal. The voice input/output device 4 also performs processing to recognize a voice from the user so that the description thereof is transferred to the processing unit 1.

The input device 5 is a unit to receive an instruction from the user, and includes hardware switches such as a scrolling key and a scale change key, a joystick, a touch panel placed on the display, and the like.

The sensors 6 to 8 and the GPS receiver 9 are utilized to detect a current position (user's vehicle position) on the in-vehicle navigation system. The wheel speed sensor 6 obtains a distance according to a product by multiplying the circumference of the wheel and the number of revolutions of the wheel being measured. Further, an angle at which the moving object makes a turn is measured according to a difference between the number of revolutions of the pertinent wheel and that of the other wheel in a pair. The geomagnetic sensor 7 senses a magnetic field held by the earth, and detects the bearings of the moving object. The gyro 8 is provided with an optical fiber gyro, a vibration gyro, and the like, and detects an angle at which the moving object makes a turn. The GPS receiver 9 receives a signal from three or more GPS satellites, and measures distances between the vehicle and each of the GPS satellites and change rates of the distances, to measure a current position, a travel direction and a travel azimuth of the moving object.

Figure 3:
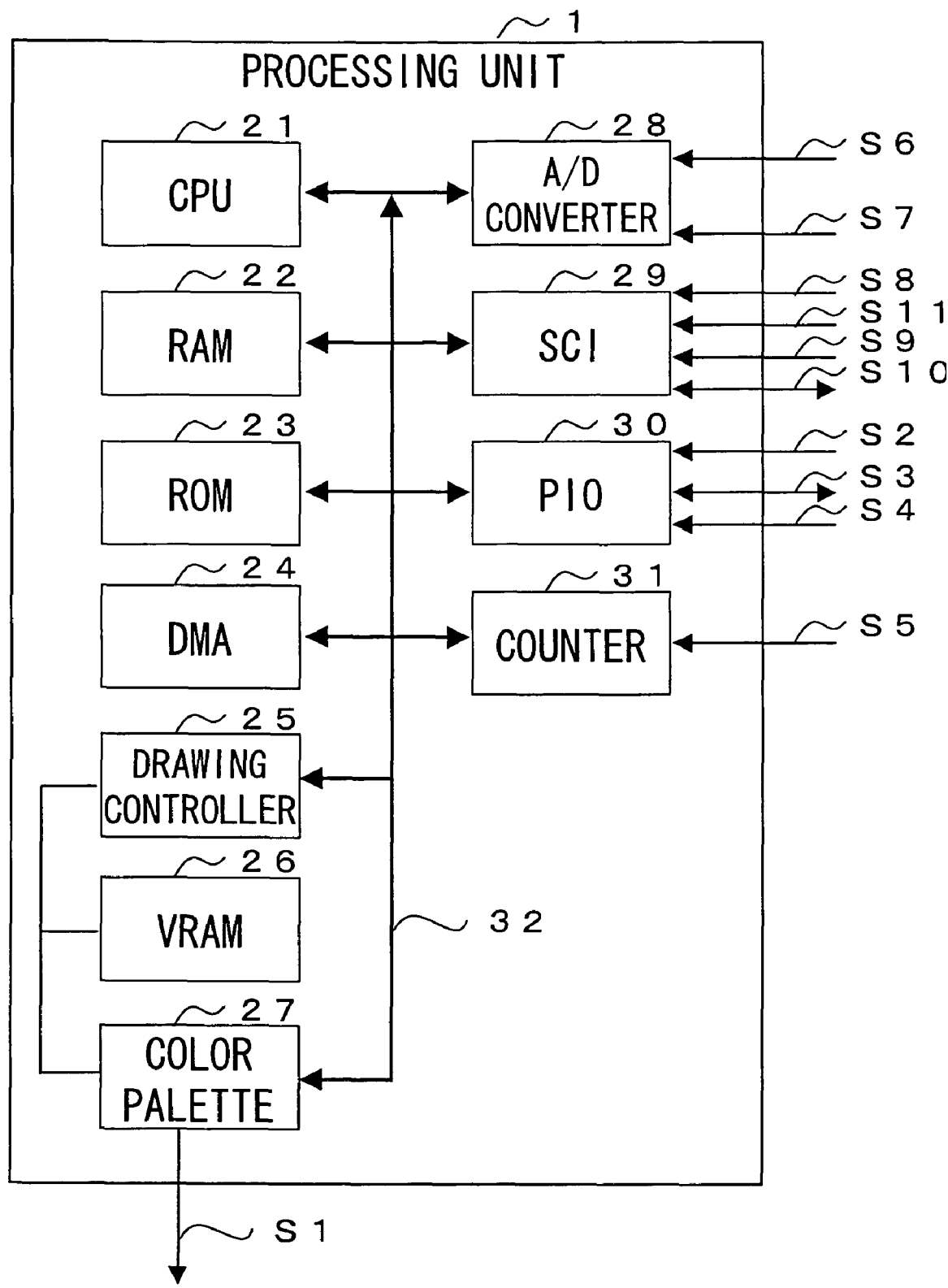
FIG. 3 is a diagram showing a hardware configuration of processing unit 1.

FIG. 3 is a diagram showing a hardware configuration of the processing unit 1.

As illustrated, the processing unit 1 has such a structure that various devices are connected to one another through a bus 32. The processing unit 1 includes a CPU (Central Processing Unit) 21 which performs various processing such as controlling the numerical calculation and each device, RAM (Random Access Memory) 22 which stores map data and computational data which are read out from the map data storage device 3, ROM (Read Only Memory) 23 which stores programs and data, DMA (Direct Memory Access) 24 which performs data transmission between memories and between each memory and each device, a drawing controller 25 which performs graphics drawing and also performing display control, VRAM (Video Random Access Memory) 26 which stores graphics image data, a color pallet 27 which converts image data to RGB signals, an A/D converter 28 which converts analog signals to digital signals, an SCI (Serial Communication Interface) 29 which converts serial signals to parallel signals which are synchronized with the bus, a PIO (Parallel Input/Output) 30 which inputs the parallel signals on the bus in synchronism with the bus, and a counter 31 which integrates pulse signals.

Figure 4:
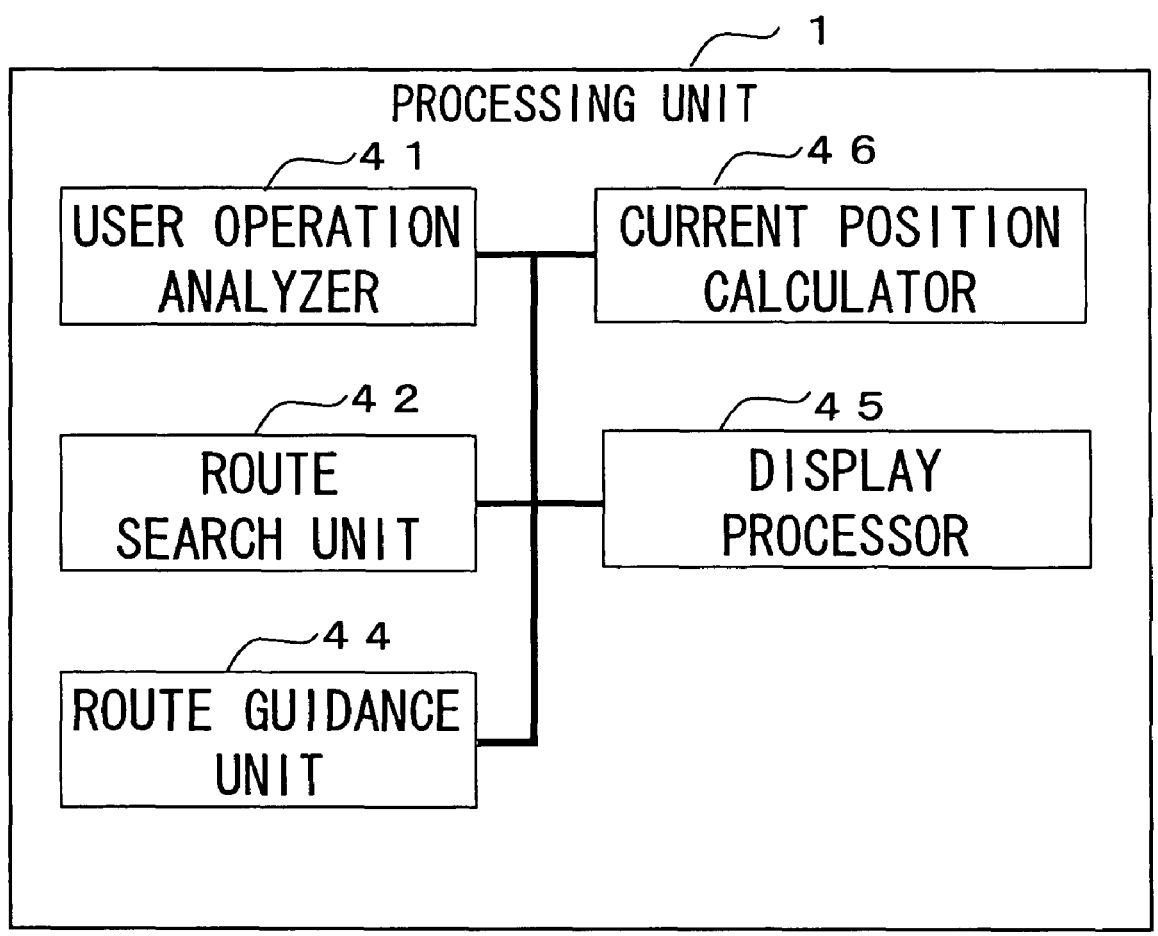
FIG. 4 is a diagram showing a functional configuration of the processing unit 1.

FIG. 4 is a diagram showing a functional configuration of the processing unit 1.

As shown in FIG. 4, the processing unit 1 includes a user operation analyzer 41, a route search unit 42, a route guidance unit 44, a display processor 45, and a current position calculator 46.

The current position calculator 46 performs processing of utilizing distance data and angle data, which are obtained by integrating each of the distance pulse data S5 measured in the wheel speed sensor 6 and the angular acceleration data S7 measured in the gyro 8, and further integrating those data items on the time axis to periodically calculate the current position (X', Y') after the vehicle runs from an initial position (X, Y) and obtain the current position by map matching process.

The user operation analyzer 41 receives a user's request inputted into the input device 5 to analyze the description of the request. It controls each of the constituent units of the processing unit 1 so that a processing corresponding to the description of the request is performed.

The route search unit 42 searches the map data for a route to reach the destination at the minimum cost (for example, minimum travel time or travel distance) out of routes connecting two specified points (the departure place or current position, and the destination), by using the Dijkstra method or the like.

The route guidance unit 44 compares information of the recommended route searched by the route search unit 42 with the current position information, and informs a user of the recommended route with voice using the voice input/output device 4 whether a vehicle should go straight on or turn to the right or left before passing a crossing, and/or by indicating a travel direction on a map displayed on the display 2.

The display processor 45 generates a drawing command so that a required video image is displayed on the display 2, and outputs the image on the display 2.

[Explanation of Operations]

Next, operations of the in-vehicle type navigation system having the above configuration will be described.

Figure 5:
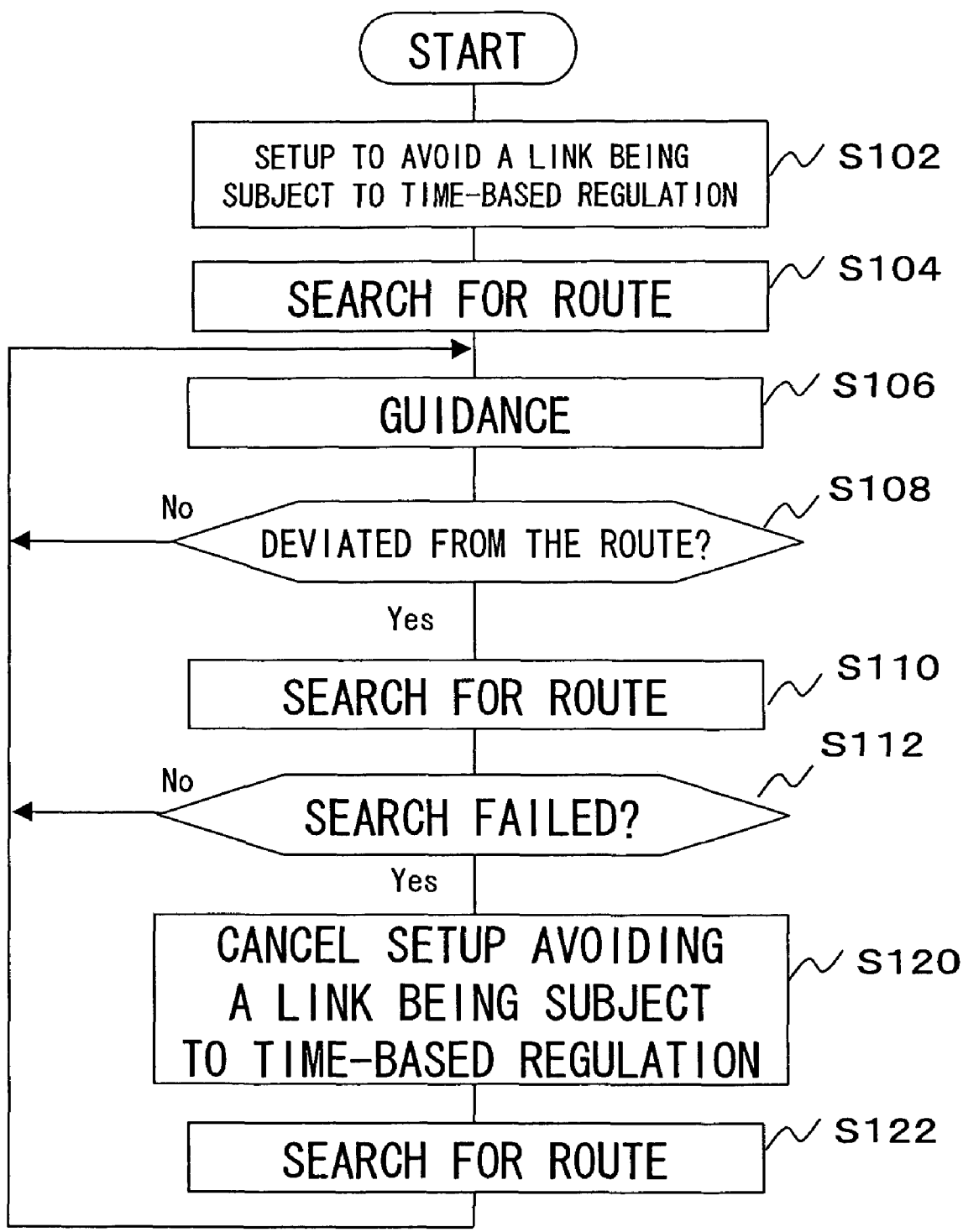
FIG. 5 is a flow diagram showing a recommended route searching processing of the in-vehicle type navigation system to which the present embodiment has been applied.

FIG. 5 is a flowchart showing a recommended route search processing of the in-vehicle type navigation system according to the present embodiment. This flow starts when the user operation analyzer 41 accepts a user's request to search for a recommended route, through the voice input/output device 4 or the input device 5.

At first, the user operation analyzer 41 sets a departure place and a destination. The user operation analyzer 41 accepts the departure place and the destination from the user via the input device 5. When the current position obtained by the current position calculator 46 is set as the departure place, designation of the departure place by the user may be omitted.

After the departure place, destination and departure time have been set as described above, the user operation analyzer 41 instructs the route search unit 42 to start a rout searching processing.

In receipt of the instruction, the route search unit 42 sets up a condition for search as avoiding a link where traffic is subject to time-based regulation (S102). Then, the route search unit 42 conducts a search for a recommended route from the departure place to the destination by using the map data 310. At this stage, the route search unit 42 refers to the regulation information 3127 of the link data 312, so as to conduct the route search in such a manner as excluding a link which is closed to traffic, according to the time-based regulation at the departure time (S104).

When the recommended route is searched out, the route search unit 42 instructs the route guidance unit 44 to start the route guidance.

In receipt of this instruction, the route guidance unit 44 starts the route guidance. In other words, the route guidance unit 44 displays a route thus searched out and the current position on the map of the display 2, and gives the instructions such as right turn or lift turn. In addition, the route guidance unit 44 monitors a deviation of the vehicle from the recommended route during the route guidance (S108). Specifically, the route guidance unit 44 monitors whether or not the current position obtained by the current position calculator 46 is placed on the recommended route. If the vehicle has deviated from the recommended route (Yes in S108), the route guidance unit 44 instructs the route search unit 42 to retry the route search.

In receipt of this instruction, the route search unit 42 retries the route search from the current position to the destination (S110). At this stage, the search condition is kept the same as used in the previous route search (S104), in such a manner as avoiding the link with the time-based regulation. Therefore, the route search unit 42 tries to search for a route, while excluding a link in which traffic is closed due to the time-based regulation at the time when the search is conducted.

When route search is successfully conducted and a new route is searched out (No in S112), the route search unit 42 instructs the route guidance unit 44 to resume the guidance with thus newly searched route (S106). In receipt of this instruction, the route guidance unit 42 resumes the route guidance by using the route thus searched (S106).

Figure 6:
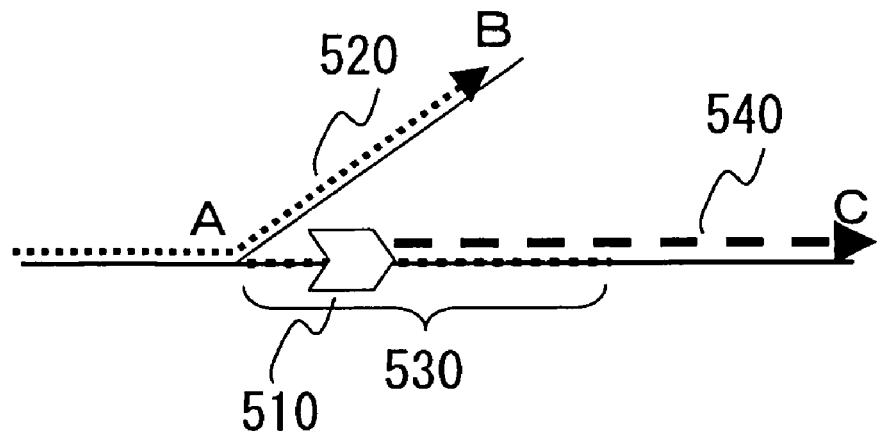
FIG. 6 is an illustration to explain the route search in the case of deviation from a recommended route.

On the other hand, there is also a case where the route search unit 42 fails in conducting the route search (Yes in S112). For example, the current position may be located on a link in which traffic is currently closed due to the time-based regulation. Such an occasion as this will be explained with reference to FIG. 6. In FIG. 6, the route 520 is a recommended route which was initially searched out. It is assumed here that the link 530 connected to the branch point A on the recommended route 520 is a link with the time-based regulation according to the regulation information 3127. However, it is also assumed that, in reality, the link 530 is not with the time-based regulation and thus the vehicle 510 deviates from the recommended route 520 at the branch point A, according to the user's decision. And, it is assumed that the vehicle 510 exists on the link 530 at present. In such an occasion as described above, it is perceived that the vehicle exists on a road on which traffic is closed, and thus the route search may end up in failure even though it is retried.

When the route search ends in failure (Yes in S112), the route search unit 42 cancels the settings for avoiding a link with the time-based regulation in the search condition (S120). Then, the route search is conducted ignoring the regulation information 3127 of the link data 312 (S122). In other words, even if the link is set as a traffic-closed link according to the regulation information 3127, the route search is conducted without excluding the link from the candidates for links that constitute the recommended route.

In FIG. 6, the route 540 is a new recommended route that has been searched out ignoring the regulation information 3127 of the link 530.

When a new recommended route is searched out in such a manner as described above, the route search unit 42 instructs the route guidance unit 44 to resume the guidance on the route thus newly searched. In receipt of this instruction, the route guidance unit 44 uses the route thus searched to resume the route guidance (S106).

If the vehicle deviates from the recommended route next time (Yes in S108), a new route search is surely conducted without failing, since the setting for avoiding the link being subject to the time-based regulation is canceled.

Figure 7:
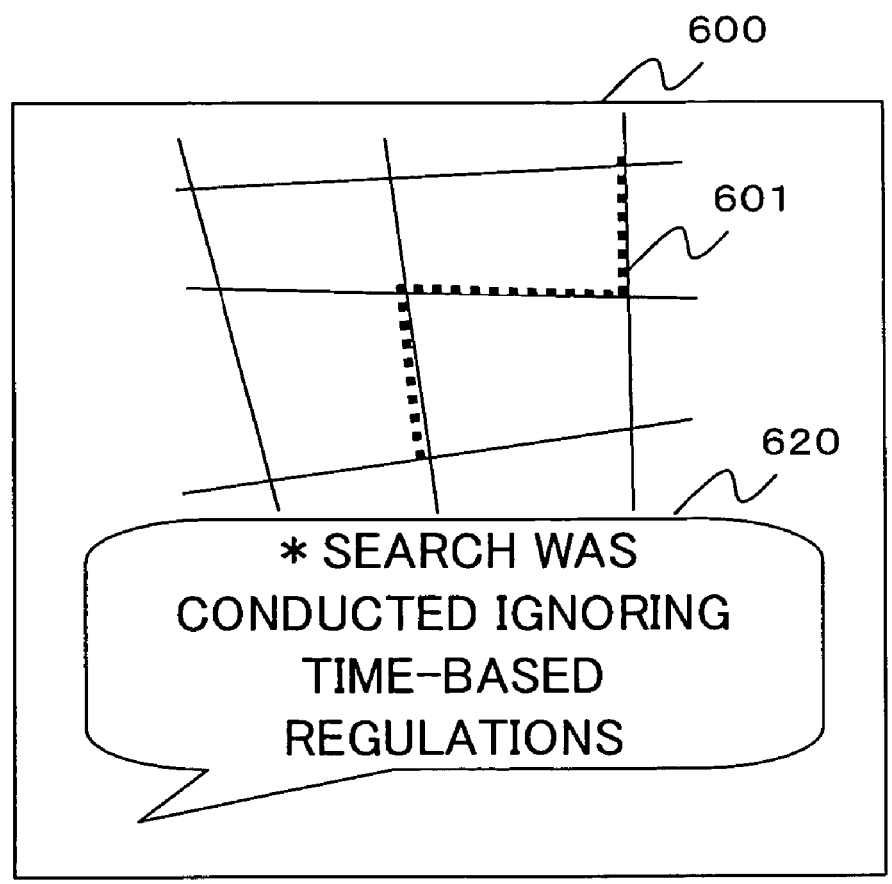
FIG. 7 is an illustration showing one example of a display screen for indicating a route that has been searched out by retrying the search.

In the case where the route search was conducted ignoring the time-based regulation, it is possible to display on the display screen 600 of the display 2, a message indicating that the search was conducted ignoring the time-based regulation together with the route 601 thus searched out, as shown in FIG. 7. Accordingly, the user is easily aware that the search was conducted ignoring the time-based regulation.

One embodiment of the present invention has been explained so far.

According to the present embodiment as described above, even in the case where the vehicle deviated from the recommended route that has been searched out, and travels along a link where traffic is closed according to the map data, searching for a new recommended route can be conducted with reliability. In other words, even in the case where the regulation information on the map data is different from the actual situation, a recommended route in line with the current conditions can be searched.

In addition, the embodiment as described above may be modified variously within the scope of the invention.

In the above embodiment, if the route search fails (Yes in S112) the route search is retried ignoring time-based regulation in all the links (S120, S122). The present embodiment is not limited to the above configuration. The retry of route search may be conducted ignoring only the regulation information of the link on which the vehicle exists at the time of searching.

Figure 8:
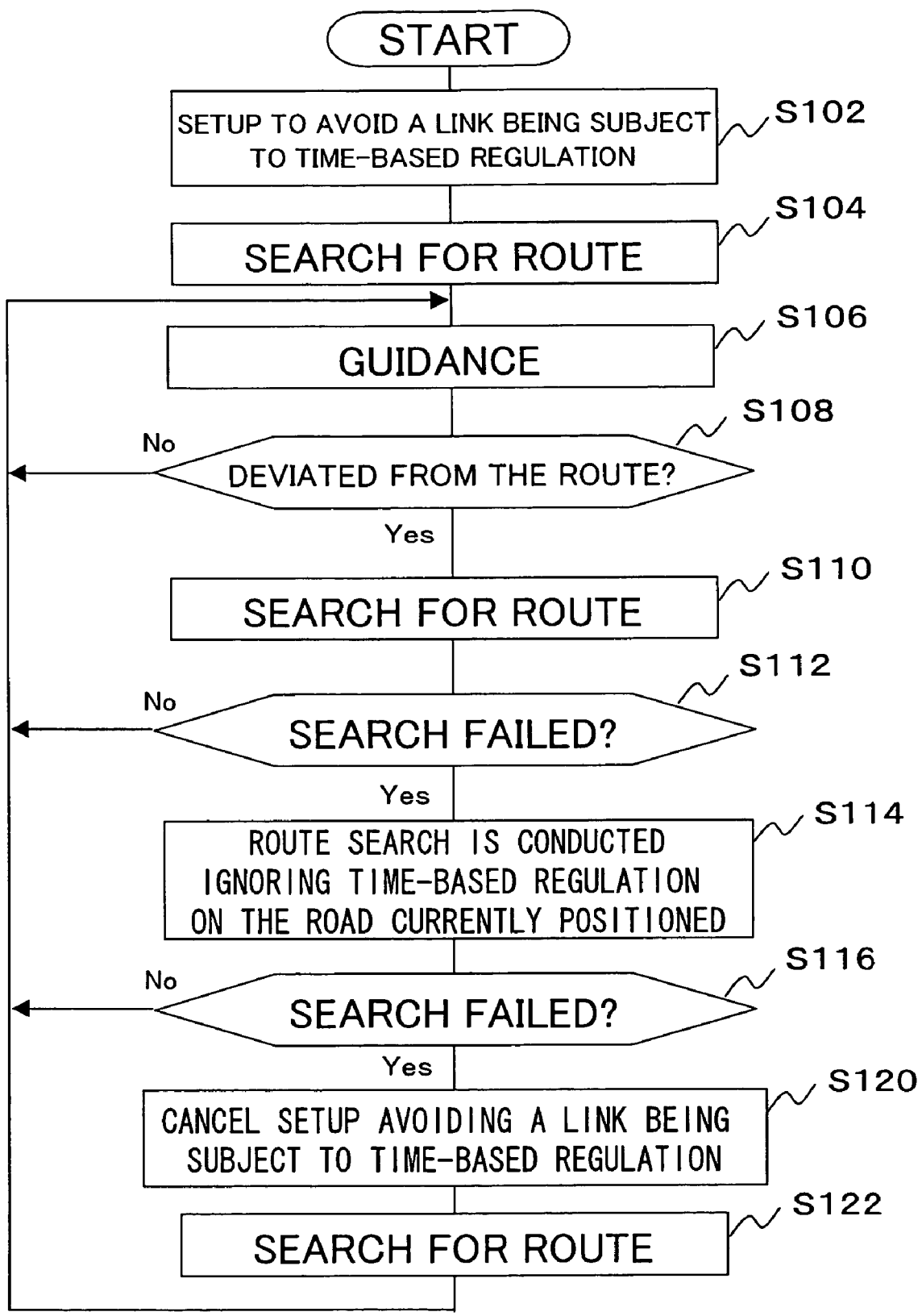
FIG. 8 is a flow diagram showing the recommended route search processing relating to a modified example.

FIG. 8 is a flow diagram showing a processing flow in such an occasion as described above. This flow is different from the flow of FIG. 5 in the point that steps S114 and S116 are included.

If the route search unit 42 fails in the route search (Yes in S112), the route search is retried ignoring the regulation information of the link where the vehicle currently exists (S114). In other words, even if the link is subject to traffic closing according to the regulation information 3127, the route search is conducted without excluding that link from the candidates of links to constitute a recommended route.

If the route search was successfully conducted (No in S116), the route search unit 42 instructs the route guidance unit 44 to resume the route guidance (S106).

Figure 9:
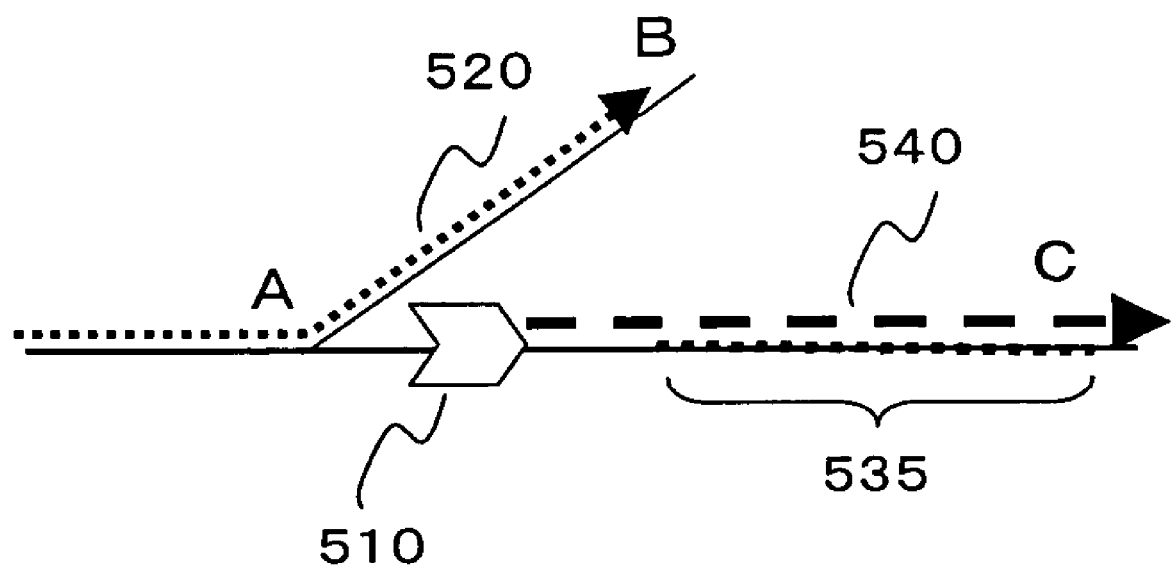
FIG. 9 is an illustration to explain a route search in the case of deviation from the recommended route.

On the other hand, there is also a case where the route search unit 42 fails in the route search (Yes in S116). FIG. 9 shows an example of failure in the route search. In FIG. 9, the reference numeral 520 indicates a recommended route that was initially searched. It is assumed that the vehicle deviated from the recommended route 520 at the branch point A. It is further assumed that the link 535 with the time-based regulation exists ahead the current position. The route from A to C is assumed to be one-way traffic. In such an occasion as described above, the vehicle 510 is forced to travel the link 535 with the time-based regulation by necessity. Therefore, if the time-based regulation on the link 535 is taken into account, the route search may fail.

In this situation of route search failure (Yes in S116), the route search unit 42 cancels the setting for avoiding a link with the time-based regulation in the search condition (S120). Then, the route search is conducted ignoring all the regulation information 3127 (S122). In other words, even if a link is subject to the traffic closing according to the regulation information 3127, the route search is conducted without excluding the link from the candidates of links to constitute the recommended route.

With the configuration above, the route search is retried ignoring the regulation information only for the link on which the vehicle exists, in the case where in reality the time-based regulation is canceled. Therefore, the route search can be conducted in line with the current conditions while considering the time-based regulation.

In addition, if the road is one-way traffic, and the road ahead the vehicle is with the time-based regulation, the route search is conducted ignoring the regulation information of the map data. Therefore, it is possible to surely search for a new route without failing in the route search.

In recent years, ride sharing (carpool) is recommended for the purpose of alleviating congested traffic conditions. Further, a traffic lane exclusive to a vehicle in which a specific number of persons are riding is placed on a road. This type of traffic lane is called as "Carpool Lane". The above embodiment of the present invention may be applied to the case where the information regarding the Carpool Lane is included in the regulation information 3127.

Such an occasion as described above will be explained with reference to FIG. 5 and FIG. 8.

As a precondition, it is assumed that the regulation information 3127 of the link data 312 includes information which lane is a Carpool Lane, information regarding the number of person-on-board required for passing through the Carpool Lane, and a time zone during when the lane is designated as Carpool Lane.

When the route search is conducted in S104, the route search unit 42 refers to the regulation information 3127, and conducts the route search excluding a link where all the lanes are Carpool Lanes at the current time of the day. It is unnecessary to exclude the link where not all of the lanes are Carpool Lanes, since there is a lane that is passable. It is also possible to accept an input of the number of person-on-board in advance, and to conduct the route search excluding a link constituted only by the Carpool Lanes which are not passable with the number of person-on-board thus inputted.

If the route search fails in S112, the route search unit 42 cancels the setting for avoiding a link being subject to the time-based regulation in the search condition (S120). Then, the route search is conducted without excluding the link from the links constituting the route, regardless of whether or not the regulation information 3127 includes the Carpool Lane.

In S114 of FIG. 8, the route search is conducted ignoring the regulation information 3127 of the link where the vehicle exists. In other words, regardless of whether or not the Carpool Lane is included, the route search is conducted without excluding the link where the vehicle exists, from the links constituting the route.

With the configuration above, even in the case where the time-based regulation relates to the Carpool Lane, the above embodiment can be applied to that situation.

It is to be noted that in the above embodiment, examples where the present invention has been applied to an in-vehicle type navigation system have been explained. However, the present invention may be applied to the navigation system other than the in-vehicle type system.

What is claimed is:

1. A route search method for searching for a plurality of interconnected links to set as a multi-link trip route to be traveled from a departure position to a final destination, the method being implementable in a navigation system provided in a moving object and carried out via a processor, and comprising:
when a route search is conducted with respect to roads having a time-based road-rule-regulation on map data, conducting the route search by ignoring at least the time-based road-rule-regulation pertaining to a road on which the moving object currently exists, to ensure that the road on which the moving object currently exists is taken as a first link of the plurality of interconnected links to set as the multi-link trip route to be traveled from the departure position to the final destination.

2. A route search method for searching for a plurality of interconnected links to set as a multi-link trip route to be traveled from a departure position to a final destination, the method being implementable in a navigation system that is provided in a moving object having a current position detecting function, the method carried out via a processor and comprising:
accessing a storage device that stores time-based road-rule-regulation information relating to time-based road-rule-regulations of respective links constituting roads on a map,
performing a route search step which searches for a route which avoids links having the time-based road-rule-regulation, by using said time-based road-rule-regulation information, and
performing a route search retrying step which conducts a retry route search which ignores said time-based road-rule-regulation information of a link upon which the moving object presently exists to ensure that the link is taken as a first link of the plurality of interconnected links to set as the multi-link trip route to be traveled from the departure position to the final destination, when said moving object deviates from the route searched by said route search step and the current position exists on the link having the time-based road-rule-regulation.

3. A route search method for searching for a plurality of interconnected links to set as a multi-link trip route to be traveled from a departure position to a final destination, the method being implementable in a navigation system that is provided in a moving object having a current position detecting function, the method carried out via a processor and comprising:
accessing a storage device that stores time-based road-rule-regulation information relating to time-based road-rule-regulations of respective links constituting roads on a map,
performing a route search step which searches for a route which avoids links with the time-based road-rule regulation, by using said time-based road-rule-regulation information, and
performing a deviation determination step which determines whether or not said moving object deviates from the route searched by said route search step, and
performing a route search retrying step which ignores at least said time-based road-rule-regulation information of the link on which the moving object currently exits in conducting a retry route search, even if it has a time-based road-rule according to a map data, to ensure that the link is taken as a first link of the plurality of interconnected links to set as the multi-link trip route to be traveled from the departure position to the final destination, when said moving object is determined to be deviated from the route and onto the link having the time-based road-rule-regulation.

4. The route search method according to claim 3, wherein, if the search fails in said route search retrying step, the retry route search is conducted ignoring said time-based road-rule-regulation information of all links.

5. The route search method according to claim 3, wherein, said route search step searches for a route which avoids links having the time-based road-rule-regulation in a time zone determined by a departure time, by using said time-based road-rule-regulation information.

6. A route search method for searching for a plurality of interconnected links to set as a multi-link trip route to be traveled from a departure position to a final destination, the method being implementable in a navigation system that is provided in a moving object having a current position detecting function, the method carried out via a processor and comprising:
   accessing a storage device that stores time-based road-rule-regulation information relating to time-based road-rule-regulations of respective links constituting roads on a map,
   performing a route search step which searches for a route which avoids links with the time-based road-rule regulation, by using said time-based road-rule-regulation information,
   performing a deviation determination step which determines whether or not said moving object deviates from the route searched by said route search step;
   performing a renewed route search step which again searches for a renewed route which avoids a link with the time-based road-rule regulation, by using said time-based road-rule-regulation information, when said moving object is determined to deviate from the route searched by said route search step, and
   performing a route search retrying step which ignores at least said time-based road-rule-regulation information of the link on which the moving object currently exists in a retrying to determine a new route, even if it has a time-based road-rule according to a map data, to ensure that the link is taken as a first link of the plurality of interconnected links to set as the multi-link trip route to be traveled from the departure position to the final destination, when said moving object is determined to be deviated from the route and onto the link having the time-based road-rule.

7. The route search method according to claim 6, wherein, if the search fails in said route search retrying step, the retry route search is again conducted ignoring said time-based road-rule-regulation information of all links.

8. A computerized navigation system for searching for a plurality of interconnected links to set as a multi-link trip route to be traveled from a departure position to a final destination for a moving object provided with a current position detection function, the navigation system configured to perform operation(s) of:
   when a route search is conducted with respect to roads having a time-based road-rule-regulation on map data, conducting the route search by ignoring at least the time-based road-rule-regulation pertaining to a road on which the moving object currently exists to ensure that the road on which the moving object currently exists is taken as a first link of the plurality of interconnected links to set as the multi-link trip route to be traveled from the departure position to the final destination.

9. A computerized navigation system for searching for a plurality of interconnected links to set as a multi-link trip route to be traveled from a departure position to a final destination for a moving object provided with a current position detection function, the navigation system configured to perform operation(s) of:
   accessing a storage device that stores time-based road-rule-regulation information relating to time-based road-rule-regulations of respective links constituting roads on a map,
   performing a route search operation which searches for a route which avoids links having the time-based road-rule-regulation, by using said time-based road-rule-regulation information, and
   performing a route search retrying operation which conducts a retry route search which ignores said time-based road-rule-regulation information of a link upon which the moving object presently exists to ensure that the link is taken as a first link of the plurality of interconnected links to set as the multi-link trip route to be traveled from the departure position to the final destination, when said moving object deviates from the route searched by said route search operation and the current position exists on the link having the time-based road-rule-regulation.

10. A computerized navigation system for searching for a plurality of interconnected links to set as a multi-link trip route to be traveled from a departure position to a final destination for a moving object provided with a current position detection function, the navigation system configured to perform operation(s) of:
   accessing a storage device that stores time-based road-rule-regulation information relating to time-based road-rule-regulations of respective links constituting roads on a map,
   performing a route search operation which searches for a route which avoids links with the time-based road-rule regulation, by using said time-based road-rule-regulation information, and
   performing a deviation determination operation which determines whether or not said moving object deviates from the route searched by said route search operation, and
   performing a route search retrying operation which ignores at least said time-based road-rule-regulation information of the link on which the moving object currently exits in conducting a retry route search, even if it has a time-based road-rule according to a map data, to ensure that the link is taken as a first link of the plurality of interconnected links to set as the multi-link trip route to be traveled from the departure position to the final destination, when said moving object is determined to be deviated from the route and onto the link having the time-based road-rule-regulation.

11. The computerized navigation system according to claim 10, wherein the navigation system configured to perform operation(s) of:
   if the search fails in said route search retrying operation, the retry route search is conducted ignoring said time-based road-rule-regulation information of all links.

12. The computerized navigation system according to claim 10, wherein the navigation system configured to perform operation(s) of:
   said route search operation searches for a route which avoids links having the time-based road-rule-regulation in a time zone determined by a departure time, by using said time-based road-rule-regulation information.

13. A computerized navigation system for searching for a plurality of interconnected links to set as a multi-link trip route to be traveled from a departure position to a final destination for a moving object provided with a current position detection function, the navigation system configured to perform operation(s) of:
   accessing a storage device that stores time-based road-rule-regulation information relating to time-based road-rule-regulations of respective links constituting roads on a map, performing a route search operation which searches for a route which avoids links with the time-based road-rule regulation, by using said time-based road-rule-regulation information, performing a deviation determination operation which determines whether or not said moving object deviates from the route searched by said route search operation;

performing a renewed route search operation which again searches for a renewed route which avoids a link with the time-based road-rule regulation, by using said time-based road-rule-regulation information, when said moving object is determined to deviate from the route searched by said route search operation, and performing a route search retrying operation which ignores at least said time-based road-rule-regulation information of the link on which the moving object currently exists in a retrying to determine a new route, even if it has a time-based road-rule according to a map data, to ensure that the link is taken as a first link of the plurality of interconnected links to set as the multi-link trip route to be traveled from the departure position to the final destination, when said moving object is determined to be deviated from the route and onto the link having the time-based road-rule.

14. The computerized navigation system according to claim 13, wherein the navigation system configured to perform operation(s) of:

if the search fails in said route search retrying operation, the retry route search is again conducted ignoring said time-based road-rule-regulation information of all links.

* * * * *